(12) United States Patent
Miwa

(10) Patent No.: US 10,284,783 B2
(45) Date of Patent: May 7, 2019

(54) IMAGING APPARATUS AND CONTROL METHOD OF IMAGING APPARATUS

(71) Applicant: CANON KABUSHIKI KAISHA, Tokyo (JP)

(72) Inventor: Kenji Miwa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 15/336,359

(22) Filed: Oct. 27, 2016

(65) Prior Publication Data
US 2017/0126981 A1 May 4, 2017

(30) Foreign Application Priority Data

Nov. 2, 2015 (JP) .................. 2015-216072

(51) Int. Cl.
*H04N 5/232* (2006.01)
*H04N 5/235* (2006.01)
*G09G 5/10* (2006.01)

(52) U.S. Cl.
CPC ........... *H04N 5/23293* (2013.01); *G09G 5/10* (2013.01); *H04N 5/2354* (2013.01); *G09G 2320/0626* (2013.01); *G09G 2340/0492* (2013.01)

(58) Field of Classification Search
CPC ....... H04N 5/00; G06F 1/1601–1/1683; G06F 1/3218; G06F 1/3265; G06F 3/14–3/153
See application file for complete search history.

(56) References Cited

U.S. PATENT DOCUMENTS

2011/0310284 A1* 12/2011 Tsujii ................. H04N 5/23216
348/333.06
2017/0034446 A1* 2/2017 Park .................... H04N 5/23293

FOREIGN PATENT DOCUMENTS

JP 2004-222037 A 8/2004
JP 2005-117395 A 4/2005

* cited by examiner

*Primary Examiner* — Paul M Berardesca
(74) *Attorney, Agent, or Firm* — Canon U.S.A., Inc. IP Division

(57) ABSTRACT

An imaging apparatus includes an imaging unit that captures an image of a subject, a display unit that displays the captured image on a display screen and is moveable so as to change the orientation of the display screen, and a control unit that controls the brightness of the display screen based on the orientation of the display screen. When a predetermined shooting mode is set and the display screen is oriented toward the subject, the control unit lowers the brightness of the display screen compared to a brightness when the display screen is not oriented toward the subject.

5 Claims, 5 Drawing Sheets

IMAGING APPARATUS AND CONTROL METHOD OF IMAGING APPARATUS

BACKGROUND

Field

Aspects of the present disclosure generally relate to an imaging apparatus and a control method of the imaging apparatus.

Description of the Related Art

An electronic camera converts light flux having passed through an imaging lens into an electrical signal by an imaging element, and further converts the electrical signal into a digital image signal by an image pickup circuit, and then compresses the digital image signal by a compression technique such as JPEG and stores the same in a memory.

In image shooting by a conventional electronic camera, a subject is observed by an optical finder. However, there have been recently commercialized electronic cameras with a live-view function by which images acquired by an imaging element are displayed on a display device such as a liquid crystal display to enable the user to capture images while observing the displayed images. In addition, those cameras are made easy to use with importance placed on the live-view function because their liquid crystal displays are vari-angle liquid crystal displays that can be angled with respect to the camera bodies in order to improve visibility for the user.

With such electronic cameras, it is not possible to verify the brightness of images under exposure to light in bulb shooting. Accordingly, the captured images can be verified only after the capturing is completed. Japanese Patent Laid-Open No. 2005-117395 proposes an electronic camera that, while reading out image data continuously in a time-division manner, adds the read image data in sequence, and performs bulb shooting while displaying on a display device the bulb-shot images acquired by the adding in sequence.

To verify the images on the illuminated display device in the electronic camera, it is necessary to control illumination of a backlight. Japanese Patent Laid-Open No. 2004-222037 discloses a technique by which the backlight is controlled so as not to turn on when a macro shooting mode is set to shoot a subject in proximity, taking into account an influence under which appropriate exposure is hindered.

When the backlight is controlled so as not to turn on when a predetermined mode is set as in the technique described in Japanese Patent Laid-Open No. 2004-222037, the electronic camera is lowered in convenience of users because the images under shooting cannot be verified in the predetermined mode.

SUMMARY OF THE INVENTION

An aspect of the present disclosure generally relates to providing an imaging apparatus that improves convenience of use without influencing shooting of a subject.

An imaging apparatus includes an imaging unit configured to capture an image of a subject, a display unit configured to display the captured image on a display screen and configured to be moveable so as to change the orientation of the display screen, and a control unit configured to control a brightness of the display screen based on the orientation of the display screen. When a predetermined shooting mode is set and the display screen is oriented toward the subject, the control unit lowers the brightness of the display screen compared to a brightness when the display screen is not oriented toward the subject.

Further features will become apparent from the following description of exemplary embodiments with reference to the attached drawings.

DESCRIPTION OF THE EMBODIMENTS

Exemplary embodiments will be explained with reference to the attached drawings.

Figure 1:
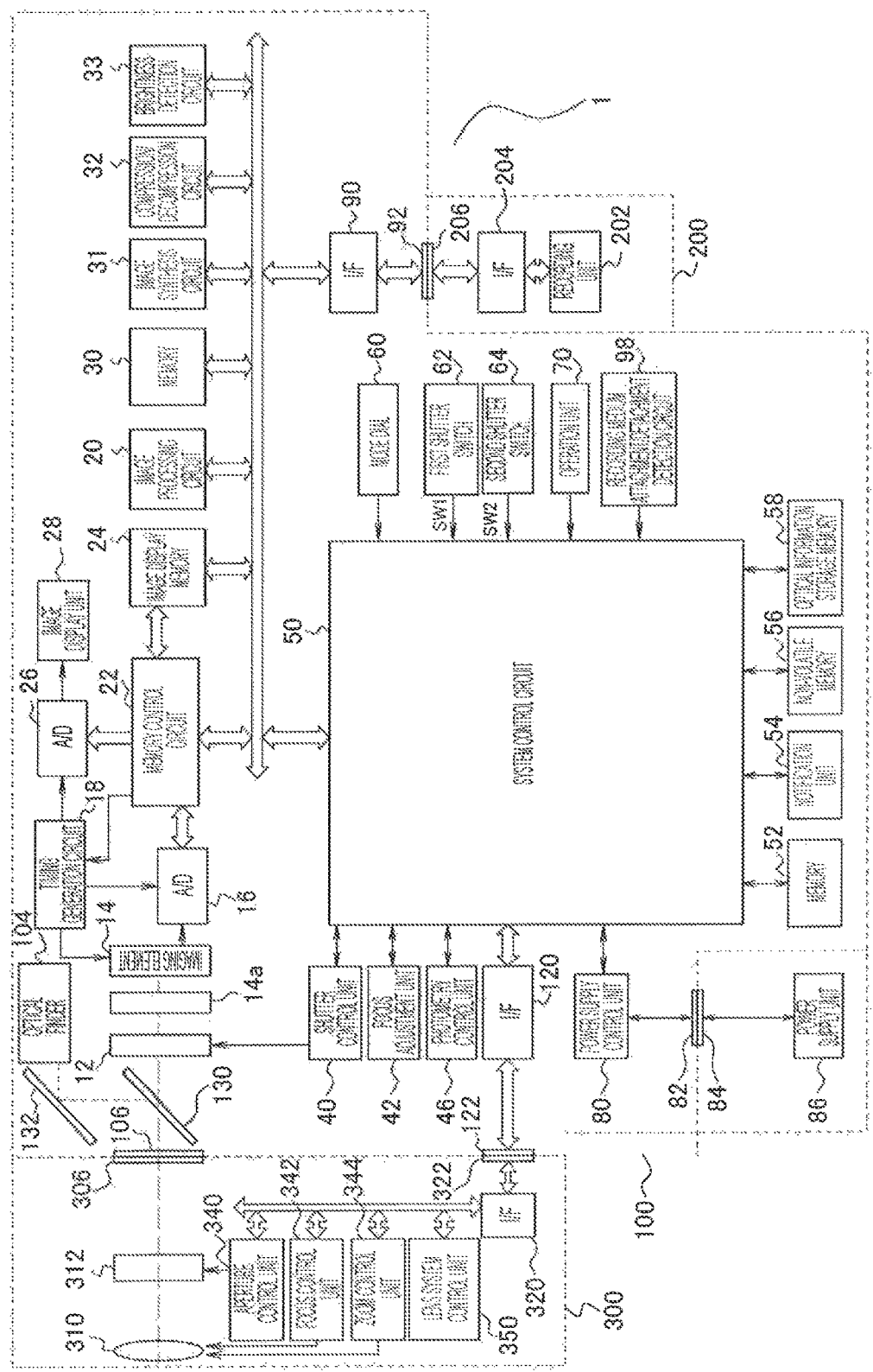
FIG. 1 is a block diagram illustrating a configuration of an imaging apparatus.

First, a configuration of an imaging apparatus 1 in an exemplary embodiment will be explained with reference to FIG. 1. FIG. 1 is a block diagram illustrating a configuration of an imaging apparatus. In the exemplary embodiment, the imaging apparatus 1 will be explained using a lens-replaceable digital still camera of single-lens reflex type as an example of the imaging apparatus 1.

As illustrated in FIG. 1, the imaging apparatus 1 includes a camera body 100 and a lens-replaceable lens unit 300.

First, components of the lens unit 300 will be explained.

An imaging lens 310 is composed of a plurality of lenses. The imaging lens 310 is an example of an optical system.

An aperture 312 serves as a light limitation unit that adjusts the amount of light entered from the lens unit 300.

A lens mount 306 mechanically combines the lens unit 300 and the camera body 100. The lens mount 306 also includes various functions to electrically connect the lens unit 300 and the camera body 100.

An interface 320 is an interface for connecting the lens unit 300 to the camera body 100 at the lens mount 306.

A connector 322 electrically connects the lens unit 300 and the camera body 100. The connector 322 also includes functions to exchange control signals, status signals, data signals, and the like between the camera body 100 and the lens unit 300 and supply electric currents at various voltages. The connector 322 can be configured to perform not only electric communications, but also optical communications, audio communications, etc.

A aperture control unit 340 controls the aperture 312 in conjunction with a shutter control unit 40 controlling a shutter 12 of the camera body 100, based on photometric information from a photometric control unit 46 of the camera body 100.

A focus control unit 342 controls focusing by the imaging lens 310.

A zoom control unit 344 controls zooming by the imaging lens 310.

A lens system control circuit 350 controls the entire lens unit 300. The lens system control circuit 350 includes a memory storing constants, variables, and programs for operations. The lens system control circuit 350 also includes a non-volatile memory storing identification information such as a unique number for the lens unit 300, management information, functional information such as maximum aperture value, minimum aperture value, and focal length, setting values in the present and the past, etc.

Next, a configuration of the camera body 100 will be explained.

A lens mount 106 mechanically combines the camera body 100 and the lens unit 300.

Mirrors 130 and 132 guide a light ray incident on the imaging lens 310 to an optical finder 104 by a single-lens reflex method. The mirror 130 can be configured as a quick-return mirror or as a half mirror.

The shutter 12 is a focal plane-type shutter.

An imaging element 14 is composed of a CCD, a CMOS sensor, and the like, and subjects a subject image to photoelectric conversion.

An optical element 14a is, for example, an optical low-pass filter that is laid out at the front side of the imaging element 14.

The light lay incident on the imaging lens 310 is guided by the single-lens reflex method via the aperture 312, the lens mounts 306 and 106, the mirror 130, and the shutter 12, and is then focused as an optical image on the imaging element 14.

An A/D converter 16 converts an analog signal (output signal) output from the imaging element 14 into a digital signal.

A timing generation circuit 18 supplies clock signals and control signals to the imaging element 14, the A/D converter 16, a D/A converter 26. The timing generation circuit 18 is controlled by a memory control circuit 22 and a system control circuit 50.

An image processing circuit 20 performs predetermined pixel interpolation processing and color conversion processing on the data from the A/D converter 16 or the data from the memory control circuit 22. The image processing circuit 20 also performs predetermined arithmetic processing as necessary with the use of image data output from the A/D converter 16. The image processing circuit 20 also performs predetermined arithmetic processing using image data output from the A/D converter 16, and performs TTL-type automatic white balance (AWB) processing based on the obtained calculation result.

The memory control circuit 22 controls the A/D converter 16, the timing generation circuit 18, the image processing circuit 20, an image display memory 24, the D/A converter 26, a memory 30, and a compression/decompression circuit 32. The image data output from the A/D converter is written into the image display memory 24 or the memory 30 via the image processing circuit 20 and the memory control circuit 22 or via only the memory control circuit 22.

The image display memory 24 stores image data and the like to be displayed on an image display unit 28.

The D/A converter 26 converts digital signals for image data and the like stored in the image display memory 24 into analog signals.

The image display unit 28 displays the image data and the like for display written into the image display memory 24 via the D/A converter 26. The image display unit 28 is a vari-angle monitor. By moving the image display unit 28 with respect to the camera body 100, the direction in which a display screen of the image display unit 28 is oriented can be changed to a first direction and a second direction as described below, or a direction between the first direction and the second direction. The first direction is equal to the direction in which the imaging lens 310 is oriented. The second direction is opposite to the direction in which the imaging lens 310 is oriented.

In addition, the image display unit 28 is composed of a thin film transistor (TFT)-type liquid crystal display (LCD) and the like. By consecutively displaying the image data captured by the use of the image display unit 28, an electronic viewfinder (EVF) function can be implemented. The image display unit 28 can also be arbitrarily turned into a display state (ON) or non-display state (OFF) under instructions from the system control circuit 50. When the image display unit 28 is in the display state, a backlight included in the image display unit 28 is on, and when the image display unit 28 is in the non-display state, the backlight in the image display unit 28 lights is off. When the image display unit 28 is in the non-display state, power consumption of the camera body 100 can be significantly reduced.

The memory 30 stores captured still images or moving image or the like. The memory 30 includes storage capacity sufficient to store a predetermined number of still images or a predetermined amount of moving image. This enables writing a large volume of images into the memory 30 at high speeds even in the case of continuous shooting and panoramic shooting in which a plurality of still images is continuously captured. In addition, at the time of shooting a moving image, the memory 30 is used as a frame buffer for images continuously written at a predetermined rate. The memory 30 can also be used as a working area for the system control circuit 50. An image synthesis circuit 31 combines a plurality of images into one composite image. The image synthesis circuit 31 simultaneously reads a plurality of image data and the like from the memory 30 and performs composite processing in the circuit to generate composite image data. The generated composite image data is written into the memory 30 or the image display memory 24. The image data to be processed by the image synthesis circuit 31 include image data converted by the A/D converter 16 and written by the memory control circuit 22 and image data processed by the image processing circuit 20.

The compression/decompression circuit 32 compresses or decompresses image data using a publicly known compression method. The compression/decompression circuit 32 reads the images from the memory 30 and performs compression processing or decompression processing on the images, and writes the processed data again into the memory 30. The compression/decompression circuit 32 also includes the function of subjecting the moving image data to compression encoding in a predetermined format or decompressing moving image signals from predetermined compression-encoded data.

A brightness detection circuit 33 detects the brightness of image data. The brightness detection circuit 33 can read image data from the memory 30 and detect the brightness of the image data.

A shutter control unit 40 controls the shutter 12 in conjunction with the aperture control unit 340 controlling the aperture 312 based on the photometric information from the photometric control unit 46.

A focus adjustment unit 42 performs focus adjustment for autofocus (AF) processing. The focus adjustment unit 42 also measures the in-focus state of the image focused as an optical image. The focused image can be obtained by entering a light ray incident on the imaging lens 310 in the lens unit 300 by the single-lens reflex method via the aperture 312, the lens mount 306, the lens mount 106, the mirror 130, and a focus adjustment sub mirror (not illustrated).

The photometric control unit 46 controls photometry for automatic exposure (AE) processing. The photometric control unit 46 measures the exposure state of the image focused as an optical image. The focused image can be obtained by entering a light ray incident on the imaging lens 310 in the lens unit 300 by the single-lens reflex method via the aperture 312, the lens mount 306, the lens mount 106, the mirror 130, and a photometric sub mirror (not illustrated).

AF control can be performed using the result of measurement by the focus adjustment unit 42 and the result of calculation of the image data from the A/D converter 16 by the image processing circuit 20. Exposure control can be performed using the result of measurement by the photometric control unit 46 and the result of calculation of the image data from the A/D converter 16 by the image processing circuit 20.

The system control circuit 50 controls the entire camera body 100 and contains a known CPU and the like. Based on the result of calculation by the image processing circuit 20, the system control circuit 50 can control the shutter control unit 40, the focus adjustment unit 42, and the like to perform AF processing, AE processing, and flash preliminary light emission (EF) processing by a contrast detection method.

A memory 52 stores constants, variables, programs, and the like for operations of the system control circuit 50.

A notification unit 54 provides operational state or sends messages or the like external to the camera body 100 using characters, images, sounds, or the like according to program execution by the system control circuit 50. The notification unit 54 is, for example, a display unit providing visual indications by an LCD or a light emitting diode (LED) or a sounding element that makes sound notification or the like. The notification unit 54 is composed of one or a combination of two or more of the display unit, the sounding element, etc. In particular, when the notification unit 54 is a display unit, the notification unit 54 is installed in one or more visible positions in the vicinity of an operation unit 70 of the camera body 100. In addition, some of the functions of the notification unit 54 are installed in the optical finder 104. The image display unit 28 can be used as the display unit of the notification unit 54.

The following are examples of indications displayed on the image display unit 28 as notifications from the notification unit 54: indications for shooting mode such as single-shooting/continuous-shooting and self-timer; indications for recording such as compression ratio, the number of recording pixels, the number of recorded images, and the number of recordable images; indications for shooting conditions such as shutter speed, aperture value, exposure correction, photometric correction, the amount of light emission of external flash, and red-eye reduction; macro shooting indication; beep setting indication; remaining battery level indication; error indication; indication for information display by multi-digit numbers; indication for attachment/detachment state of a recording medium 200; indication for attachment/detachment state of the lens unit 300; indication for operations of communication I/F; date/time indication; and indication for state of connection with an external computer.

The following are examples of indications provided on the optical finder 104 as notifications from the notification unit 54: in-focus indication; indication for completion of shooting preparation; indication for camera shake; indication for flush charging; indication for completion of flash charging; shutter speed indication; aperture value indication; exposure correction indication; indication for recording medium writing operation; etc.

A non-volatile memory 56 stores programs described below, etc. The non-volatile memory 56 is a non-volatile memory that enables electrical erasing and recording, and is an EEPROM or the like, for example.

An optical information storage memory 58 stores various kinds of lens information obtained from the lens unit 300 via a connector 122.

A mode dial switch 60, a first shutter switch 62, a second shutter switch 64, and the operation unit 70 constitute a manipulating device for inputting instructions for various operations of the system control circuit 50. The mode dial switch 60, the first shutter switch 62, the second shutter switch 64, and the operation unit 70 are composed of one or more of switches, dials, a touch panel, a pointing device with viewpoint detection, a speech recognition device, etc.

The mode dial switch 60 enables the user of the imaging apparatus 1 to set one of shooting modes of the imaging apparatus 1. The shooting modes of the imaging apparatus 1 include automatic shooting mode, program shooting mode, shutter speed-priority AE mode, aperture priority AE shooting mode, manual exposure mode, and focal depth priority (depth) shooting mode. The shooting modes of the imaging apparatus 1 also include portrait shooting mode, landscape shooting mode, macro shooting mode, sports shooting mode, nightscape shooting mode, panoramic shooting mode, etc.

The first shutter switch 62 is turned on during operation, e.g., half-pressing, of a shutter button (not illustrated) and transmits a first signal SW1 to the system control circuit 50 to instruct starting AF processing, AE processing, AWB processing, flash pre-emission (EF) processing, etc.

The second shutter switch 64 is turned on at the completion of operating, e.g., full press, a shutter button (not illustrated) and transmits a second signal SW2 to the system control circuit 50. By the transmission, the second shutter switch 64 instructs starting a series of operations, including exposure processing, development processing, and recording processing.

In the exposure processing, the signal read from the imaging element 14 is written into the memory 30 via the A/D converter 16 and the memory control circuit 22. Next, the development processing is performed with calculations in the image processing circuit 20 and the memory control circuit 22. Then, in the recording processing, the image data is read from the memory 30, compressed by the compression/decompression circuit 32, and then written into the recording medium 200.

The operation unit 70 is composed of various buttons, a touch panel, etc. As an example, the operation unit 70 includes a live-view start/stop button, a movie recording start/stop button, a menu button, a set button, a multi-screen reproduction page-break button, a flash setting button, and a single-shooting/continuous-shooting/self-timer switch button.

The operation unit 70 also includes a menu movement + (plus) button, a menu movement − (minus) button, an electronic zoom + (plus) button, an electronic zoom − (minus) button, a live-view enlargement + (plus) button, and a live-view enlargement − (minus) button.

The operation unit 70 also includes a playback movement + (plus) button, a playback movement − (minus) button, a captured image quality selection button, an exposure correction button, a photometric correction button, an external flash emission light amount setting button, a date/time setting button, etc. The foregoing plus and minus buttons include rotary dial switches to enable easier selection of numeric values and functions.

The operation unit 70 also includes an image display ON/OFF switch for setting the display state (ON) and the non-display state (OFF) of the image display unit 28.

The operation unit 70 also includes a QUICK REVIEW ON/OFF switch for setting the quick review function by which the captured image data is automatically replayed immediately after capturing.

The operation unit 70 also includes a compression mode switch for selecting the compression ratio by JPEG compression or selecting a RAW mode in which the signal from the imaging element is directly digitized and recorded in a recording medium.

The operation unit 70 also includes an AF mode setting switch for setting a one-shot AF mode and a servo AF mode, etc. In the one-shot AF mode, the AF operation is started when the first shutter switch 62 is turned on, and when focus is achieved once, the focused state is continuously kept. In the servo AF mode, the AF operation is continuously performed while the first shutter switch 62 is ON.

A power supply control unit 80 includes a battery detecting circuit, a DC-DC converter, a switch circuit for switching blocks to be energized, etc. The power supply control unit 80 detects the presence or absence of attachment of batteries, the type of the batteries, and the remaining battery level, controls the DC-DC converter based on the detection result and the instruction from the system control circuit 50, and supplies a necessary voltage to the individual components including the recording medium for a necessary period.

A connector 82 electrically connects to the power supply control unit 80.

A connector 84 electrically connects to a power supply unit 86. The connector 82 and the connector 84 are detachable.

The power supply unit 86 is a power supply composed of primary batteries such as alkaline batteries or lithium batteries, secondary batteries such as NiCd batteries, NiMH batteries, Li-ion batteries, or Li polymer batteries, an AC adapter, etc.

An interface 90 is an interface between a recording medium such as a memory card, a hard disc, or a PC and the camera body 100.

A connector 92 is a connector that connects to a recording medium such as a memory card or a hard disc, or a PC.

A recording medium installation detecting circuit 98 detects whether the recording medium 200 is attached to the connector 92.

The interface 90 and the connector 92 are configured in conformity with various known storage media standards. For example, the interface 90 and the connector can be personal computer memory card international association (PCMCIA) cards, CompactFlash® (CF) cards, SD cards, etc. When the interface 90 and the connector 92 are configured in conformity with standards for PCMCIA cards, CF cards, and the like, the various communication cards can be connected. The communication cards include LAN cards, modem cards, universal serial bus (USB) cards, Institute of Electrical and Electronic Engineers (IEEE) 1394 cards. In addition, the communication cards can include P1284 cards, small computer system interface (SCSI) cards, PHSs, etc. Connecting the various communication cards enables exchanging image data and management information attached to the image data with peripheral devices such as other computers and printers.

The optical finder 104 can guide a light ray incident on the imaging lens 310 by the single-lens reflex method via the aperture 312, the lens mount 306, the lens mount 106, the mirror 130, and the mirror 132, and focus and display the same as an optical image. This enables performing image capturing only by the optical finder without the use of the electronic viewfinder function of the image display unit 28. The optical finder 104 is also used as a function of the notification unit 54 to provide, for example, indications for in-focus state, camera shake, flash charging, shutter speed, aperture value, exposure correction, etc.

An interface 120 connects the camera body 100 and the lens unit 300 within the lens mount 106.

A connector 122 electrically connects the camera body 100 and the lens unit 300. Whether the lens unit 300 is attached to the lens mount 106 and the connector 122 is detected by a lens attachment/detachment detection unit (not illustrated). The connector 122 exchanges control signals, status signals, data signals, and other signals between the camera body 100 and the lens unit 300. The connector 122 includes the function of supplying electric current at various voltages. In addition, the connector 122 can be configured to perform optical communications and audio communications, as well as electric communications.

The recording medium 200 is a recording medium such as a memory card or a hard disc. The recording medium 200 includes a recording unit 202 composed of a semiconductor memory, a magnetic disc, or the like, an interface 204 with the camera body 100, and a connector 206 for connection with the camera body 100. The recording medium 200 can be a memory card such as PCMCIA card or Compact-Flash®, a hard disc, etc. Alternatively, the recording medium 200 can be a micro DAT, a magneto-optical disc, an optical disc such as a CD-R or a CD-RW, or a phase-change optical disc such as a DVD.

The user can perform bulb shooting by using the thus configured imaging apparatus 1 and setting the imaging apparatus 1 to the mode for bulb shooting. In bulb shooting, the user can perform long-time exposure for an exposure period determined by the user and perform exposure plural times on a periodic basis. During bulb shooting, the user can cause the image data under capturing to be displayed on the image display unit 28, and verify the brightness of the image during bulb shooting. In the following description, the image data under capturing displayed on the image display unit 28 will be called "verification image".

Next, the flow of a process by the imaging apparatus 1 for displaying the verification images during bulb shooting on the image display unit 28 will be explained with reference to the flowchart in FIG. 2.

The process performed by the imaging apparatus 1 during bulb shooting includes accumulation 301, readout 302, addition 303, image processing 304, and display 305.

At the accumulation 301, the accumulation of electric charge in the pixels of the imaging element 14 is carried out. Upon lapse of accumulation period P since start of the accumulation 301, the readout 302, described below, is performed to bring the electric charge in the pixels of the imaging element 14 into zero, and the accumulation 301 is re-started. That is, as illustrated in FIG. 2, the accumulation 301 including accumulation 301A, accumulation 301B, and accumulation 301C is repeated. Accordingly, the exposure of the imaging element 14 is not interrupted. The first accumulation 301A is started when the user fully presses the shutter button to turn on the second shutter switch 64 and start bulb shooting and the system control circuit 50 instructs for starting image exposure.

At the readout 302, after lapse of the accumulation period P since start of the accumulation 301, the electric charge in the pixels of the imaging element 14 is retrieved as analog image data. The image data retrieved from the imaging element 14 is the electric charge having been accumulated so far in the pixels of the imaging element 14. At the instant when the image data is retrieved from the imaging element 14, the electric charge accumulated in the pixels of the imaging element 14 becomes zero. The analog image data is converted into digital image data by the A/D converter 16 and written into the memory 30 by the memory control circuit 22. Accordingly, at the readout 302, the digital image data is generated from the electric charge in the pixels of the imaging element 14. The readout 302 is performed at each accumulation period P as illustrated in FIG. 2. In addition, the readout 302 and the accumulation 301 started after the start of the readout 302 are conducted in parallel. For example, the readout 302A and the accumulation 301B are carried out in parallel.

At the addition 303, after the readout 302, the image data written into the memory 30 at the previous readout 302 and the added image data generated at the previous addition 303 are subjected to an adding process to generate newly added image data. The new added image data is written into the memory 30. The adding process is carried out by the image synthesis circuit 31.

At the first addition 303A after start of bulb shooting, there exists no added image data to be added and thus the adding process is omitted. However, the image data written into the memory 30 at the readout 302 is handled as added image data generated in the adding process.

At the second addition 303B, the added image data written into the memory 30 at the first addition 303A and the image data written into the memory 30 at the second readout 302B are subjected to an adding process to generate newly added image data. The new added image data is written into the memory 30.

At the third and subsequent addition 303, as at the second addition 303B, the added data written into the memory 30 at the previous addition 303 and the image data written into the memory 30 at the previous readout 302 are subjected to an adding process to generate newly added image data. The new added image data is written into the memory 30.

Accordingly, the added image data ranging from the image data generated at the first readout 302 after start of bulb shooting (the image data generated from the pixels of the imaging element 14) to the image data generated at the readout 302 immediately before the addition 303 is generated at the addition 303.

At the instant when the image data is retrieved from the imaging element 14 at the readout 302, the electric charge accumulated in the pixels of the imaging element 14 becomes zero. Accordingly, the added image data generated at the addition 303 is digital image data corresponding to the electric charge accumulated in the pixels of the imaging element 14 from the start of bulb shooting to the latest readout. The image processing 304 is performed after the addition 303. At the image processing 304, the added image data generated at the addition 303 and saved in the memory 30 is subjected to image processing by the image processing circuit 20 to generate displayable image data. The displayable image data is written into the image display memory 24 by the memory control circuit 22.

At the display 305, the image data written into the image display memory 24 (the added image data after image processing) is displayed as verification image on the image display unit 28. The user can verify the brightness of the image during bulb shooting with reference to the verification image.

As described above, the accumulation 301 is performed for the accumulation period P. After the first accumulation 301A is performed for the accumulation period P, the first readout 302A is started and the electric charge is retrieved from the pixels of the imaging element 14. In addition, in parallel to the readout 302A, the second accumulation 301B is started. Upon completion of the first readout 302A, the first addition 303A is started. As described above, however, there exists no added image data to be added at the first addition 303A and thus the adding process is omitted. After the completion of the first addition 303A, the first image processing 304A is started on the added image data. After the completion of the first image processing 304A, the first display 305A is performed and the added image data after image processing is displayed as verification image on the image display unit 28.

Similarly, after the completion of the second accumulation 301B, the second readout 302B, the second addition 303B, the second image processing 304B, and the second display 305B are performed in sequence. In addition, the third accumulation 301C is started in parallel to the second readout 302B.

Figure 2:
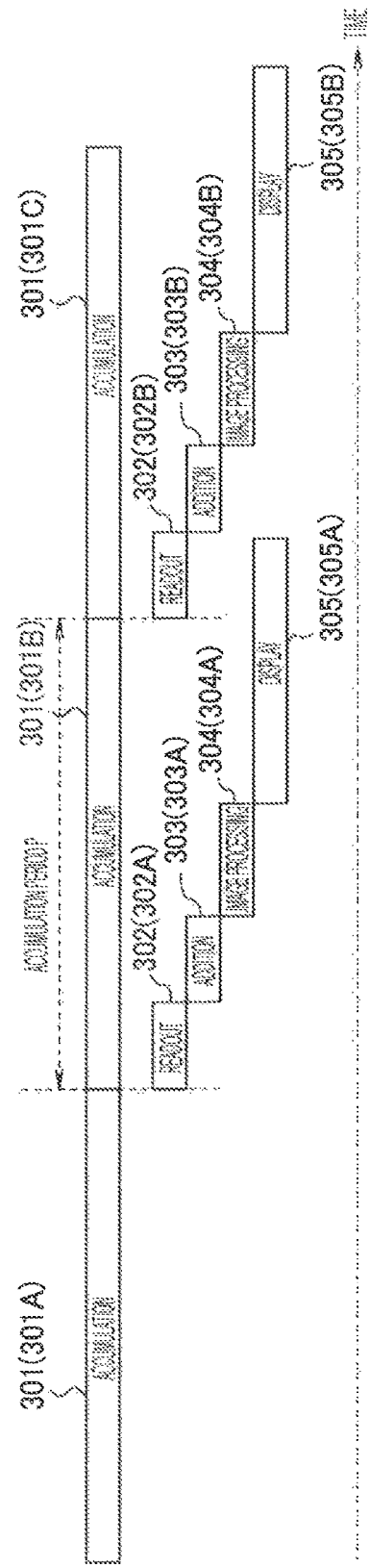
FIG. 2 is a flowchart of a process by the imaging apparatus to display verification images during bulb shooting on an image display unit.

In the example illustrated in FIG. 2, the first readout 302A, the first addition 303A, and the first image processing 304A fall within the accumulation period P. The added image data processed by the n-th image processing 304 should not be overwritten by the (n+1)-th addition 303 by which to subject the image data obtained by the (n+1)-th accumulation 301 to an adding process until the completion of the n-th image processing 304. Accordingly, the n-th readout 302 to the n-th image processing 304 need to be performed so as not to overlap a series of processes for the next image.

If the processes overlap, it is necessary to divide the storage region in the memory 30 between the added image data obtained by the n-th addition 303 and the added image data obtained by the (n+1)-th addition 303. Dividing the storage region in the memory 30 requires the large-capacity memory 30 for shooting for a long period such as bulb shooting. Accordingly, by storing the added image data in the same region of the memory 30 so as not to overlap the series of image processing operations, it is possible to enable long-period bulb shooting without heavy consumption of the memory.

It is assumed that the user performs bulb shooting by the imaging apparatus 1 under dim environmental light. Accordingly, when the verification image is displayed with the backlight of the image display unit 28 turned on to enable the user to verify the brightness of the image during bulb shooting, the light from the backlight of the image display unit 28 may affect the image data depending on the status of the imaging apparatus 1. Therefore, it is necessary to switch lighting control of the image display unit 28 depending on the status of the imaging apparatus 1.

As described above, the image display unit 28 is a vari-angle monitor (vari-angle TFT in the case of a TFT-type LCD) and the display screen of the image display unit 28 can be switched in orientation. The imaging apparatus 1 controls the brightness of the display screen of the image display unit 28 according to the orientation of the display screen of the image display unit 28. Specifically, when the display screen of the image display unit 28 is oriented toward the subject side, the light from the backlight of the image display unit 28 can reach the imaging element 14 through the imaging lens 310 in the imaging apparatus 1 to affect the image data. Accordingly, when the display screen of the image display unit 28 is oriented toward the subject side, the imaging apparatus 1 controls the backlight of the image display unit 28 to be turned off. In the following description, the state in which the display screen of the image display unit 28 is oriented toward the subject side will also be referred to as the state in which the display screen of the image display unit is oriented forward. In the embodiment, when the orientation of the display screen of the image display unit 28 is equal to the orientation of the imaging lens 310, the display screen of the image display unit 28 is regarded to be oriented toward the subject side.

Next, a process by which the imaging apparatus 1 displays the verification image on the image display unit 28 during bulb shooting will be explained with reference to the flowchart of FIG. 3.

Figure 3:
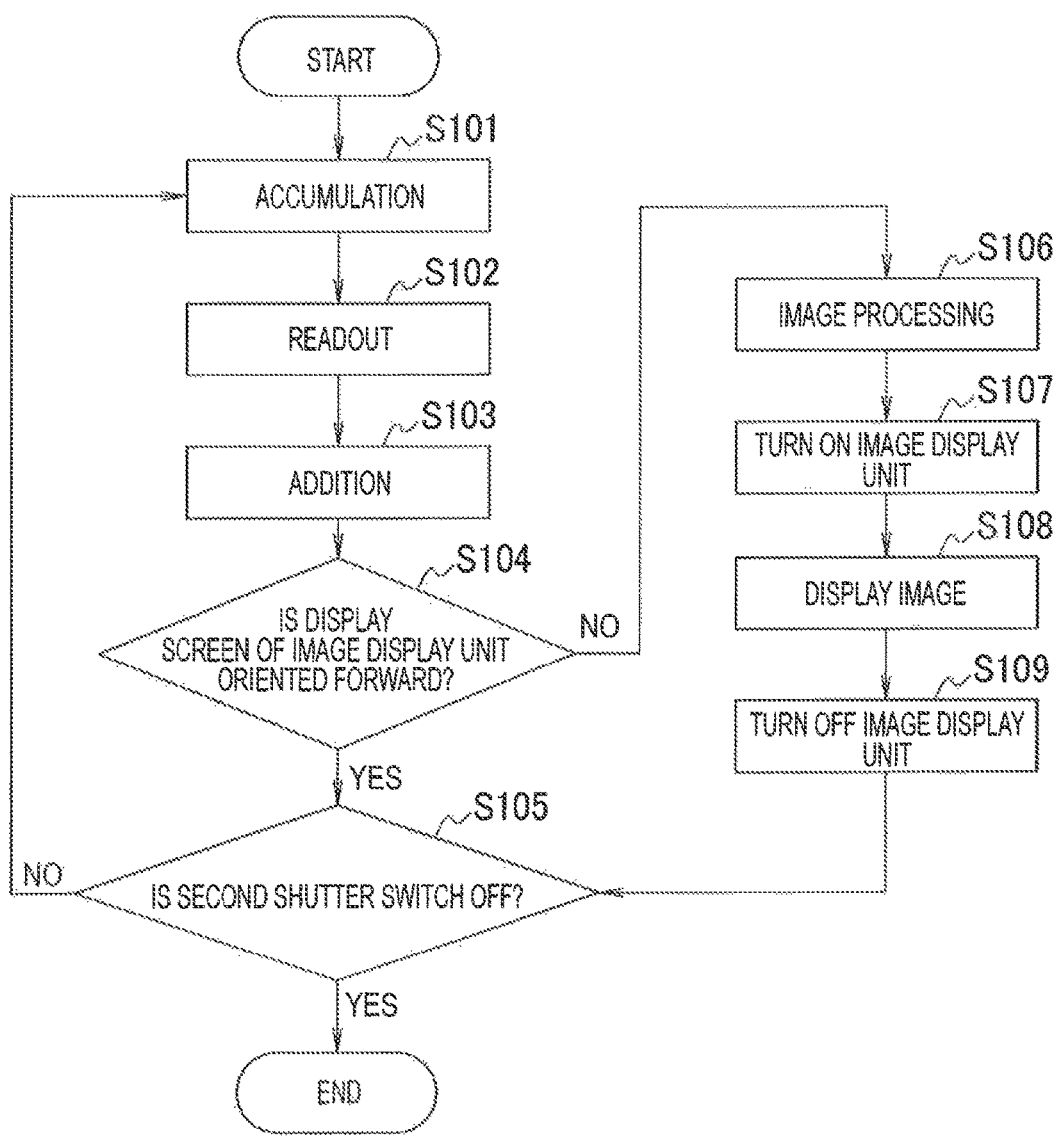
FIG. 3 is a flowchart of a process by the imaging apparatus to display the verification image during bulb shooting.

The process described in FIG. 3 is started by the start of bulb shooting.

At step S101, the imaging element 14 performs the accumulation 301 explained above with reference to FIG. 2 to accumulate electric charge in the pixels of the imaging element 14.

At step S102, after the accumulation 301 is performed for the accumulation time P, the readout 302 explained above with reference to FIG. 2 is performed under control of the system control circuit 50 to generate image data from the electric charge accumulated in the pixels of the imaging element 14.

At step S103, the addition 303 explained above with reference to FIG. 2 is performed under control of the system control circuit 50. Specifically, the added image data generated by the previous addition 303 and the image data generated by the readout 302 at step S102 are subjected to an adding process to generate new added image data.

At step S104, the system control circuit 50 determines the orientation of the display screen of the image display unit 28. An angle sensor is disposed at the hinge of the part of the image display unit 28 attached to the camera body 100. The angle sensor detects the orientation of the display screen of the image display unit 28 (the angle of the LCD of the image display unit 28).

When the display screen of the image display unit 28 is oriented forward, the system control circuit 50 moves the process to step S105. The system control circuit 50 moves the process to step S105 to turn off the backlight of the image display unit 28 so that the added image data generated at step S103 is not displayed on the image display unit 28.

When the display screen of the image display unit 28 is not oriented forward, the system control circuit 50 moves the process to step S106. Then, the system control circuit 50 displays the added image data generated at step S103 as verification image on the image display unit 28.

At step S105, the system control circuit 50 determines whether the second shutter switch 64 is turned off. When the second shutter switch 64 is off, the system control circuit 50 terminates the process described in FIG. 3. When the second shutter switch 64 is on, the system control circuit 50 returns the process to step S101 to maintain the exposure of the imaging element 14 and continue bulb shooting.

At step S106, the image processing 304 explained above with reference to FIG. 2 is performed under control of the system control circuit 50, and the added image data generated at step S103 is converted into displayable image data.

At step S107, the backlight of the image display unit 28 is turned on under control of the system control circuit 50.

At step S108, the displayable image data generated at step 106 is displayed as verification image on the image display unit 28 under control of the system control circuit 50. Steps S107 and S108 correspond to the display 305 illustrated in FIG. 2.

At step 109, after the image data is displayed on the image display unit 28 for a specific period of time, the backlight of the image display unit 28 is turned off under control of the system control circuit 50.

In the embodiment, when the orientation of the display screen of the image display unit 28 is equal to the orientation of the imaging lens 310, the imaging apparatus 1 turns off the backlight of the image display unit 28. Therefore, it is possible to suppress influence of the backlight of the image display unit 28 on the image data even under dim environmental light. That is, it is possible to suppress influence on shooting of the subject.

When the orientation of the display screen of the image display unit 28 is not equal to the orientation of the imaging lens 310, the backlight of the image display unit 28 is turned on to display the added image data. Accordingly, the user can verify the brightness of the image with reference to the image during bulb shooting by changing the angle of the display screen of the image display unit 28. Therefore, the imaging apparatus 1 is improved in convenience at the time of bulb shooting.

In addition, in the following description, when the orientation of the display screen of the image display unit 28 is not equal to the orientation of the imaging lens 310, the image data is displayed on the image display unit 28 for a specific period of time, and then the backlight of the image display unit 28 is turned off. Alternatively, even when the orientation of the display screen of the image display unit 28 is not equal to the orientation of the imaging lens 310, the backlight of the image display unit 28 may not be turned off but can remain on because the influence of the backlight on the image data is small. In that case, the orientation of the display screen of the image display unit 28 is determined on a regular basis, and the backlight can be turned off only when the display screen of the image display unit 28 is orientated toward the shooting direction.

As described, in the present exemplary embodiment, it is determined whether to turn on the backlight of the image display unit 28 based on the orientation of the display screen of the image display unit 28 as described in FIG. 3. In another exemplary embodiment, information other than the orientation of the display screen of the image display unit 28 can be used to determine whether to turn on the backlight of the image display unit 28 in a multifaceted manner.

Another example of the imaging apparatus 1 displaying the verification image during bulb shooting will be explained with reference to the flowchart of FIG. 4, where the imaging apparatus 1 determines whether to turn on the backlight of the image display unit 28 taking into account the orientation of the display screen of the image display unit 28 and the brightness of the added image data.

Figure 4:
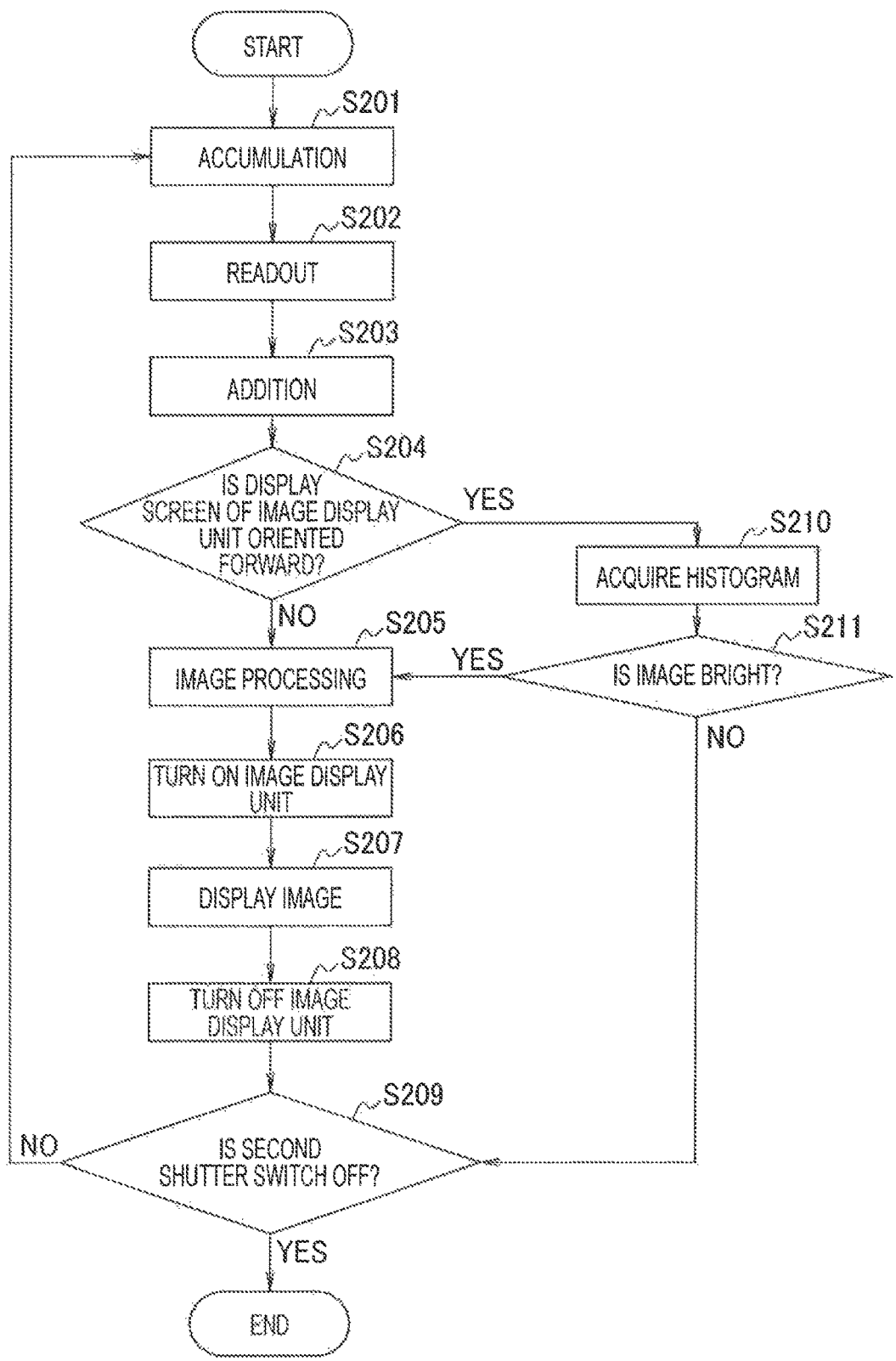
FIG. 4 is a flowchart of another process by the imaging apparatus to display the verification images during bulb shooting.

Steps S201 to S204 described in FIG. 4 are the same as steps S101 to S104 described in FIG. 3, respectively, and descriptions thereof will be omitted. However, at step S204, the system control circuit 50 moves the process to step S210 when the display screen of the image display unit 28 is oriented forward, and moves the process to step S205 in a different case.

At step S210, a histogram is acquired to determine the brightness of the added image data generated at step S203 under control of the system control circuit 50. The histogram is acquired by the brightness detection circuit 33.

At step S211, the system control circuit 50 determines the brightness of the added image data from the histogram acquired at step S210.

When it is determined that the added image data is bright, even though the backlight of the image display unit 28 is turned on, the influence of the light from the backlight on the image data is small. When determining that the added image data is bright, the system control circuit 50 moves the process to step S205.

When it is determined that the added image data is less bright, the influence of the light from the backlight of the image display unit 28 on the image data is large. When determining that the image data is less bright, the system control circuit 50 moves the process to step S209 without turning on the backlight of the image display unit 28.

The brightness of the added image data is determined depending on whether the added image data is of higher brightness than predetermined brightness. For example, the system control circuit 50 calculates the average brightness of the added image data from the histogram acquired at step S210. When the average brightness is higher than a predetermined value, the system control circuit 50 determines that the added image data is bright. Alternatively, the system control circuit 50 can determine that the added image data is bright when the brightness with the maximum frequency of the histogram is larger than a predetermined value. Otherwise, the system control circuit 50 can determine that the added image data is bright by another method using the histogram.

Steps S205 to S208 are the same as steps S106 to S109 described in FIG. 3 for displaying the added image data on the image display unit 28, respectively, and descriptions thereof will be omitted. In addition, step S209 is the same as step S105 described in FIG. 3 and descriptions thereof will be omitted.

As described above, when the imaging apparatus 1 performs the process described in FIG. 4 and determines that the added image data is bright, the added image data is displayed with the backlight of the image display unit 28 turned on even though the display screen of the image display unit 28 is oriented forward. Therefore, it is possible to increase the occasions when the added image data is displayed on the image display unit 28 without influence on shooting of the subject, thereby improving the convenience of the imaging apparatus 1 in bulb shooting.

Next, the operation for terminating bulb shooting when the second shutter switch 64 is turned off will be explained.

In the examples of FIGS. 3 and 4, after the addition 303 at steps S103 and S203, a predetermined process is performed and then it is determined whether the second shutter switch 64 is turned off at steps S105 and S209. However, when the user operates the shutter switch in the imaging apparatus 1 to turn off the second shutter switch 64, the exposure is terminated even before it is determined whether the second shutter switch 64 is turned off as described in FIGS. 3 and 4. Accordingly, at the last accumulation 301 during which the second shutter switch 64 is turned off, the exposure time of the pixels of the imaging element 14 become shorter than the accumulation period P illustrated in FIG. 2. Then, the last readout 302, the last addition 303, and the last image processing 304 are performed to generate the final image data, and the final image data is displayed on the image display unit 28.

At the last readout 302 after the last accumulation 301, the electric charge is retrieved from the pixels of the imaging element 14 to generate the digital image data, and the digital image data is written into the memory 30 as at the readout 302 during bulb shooting.

At the last addition 303, the added image data generated by the previous addition 303 and saved in the memory 30 and the image data generated at the readout 302 are subjected to an adding process by the image synthesis circuit 31 to generate the final image data as at the addition 303 during bulb shooting.

At the last image processing 304, the final image data is subjected to image processing by the image processing circuit 20 and written into the image display memory 24 by the memory control circuit 22.

Then, the image data written in the image display memory 24 is displayed on the image display unit 28.

Accordingly, the user can verify the brightness of the image with reference to the final image data obtained by bulb shooting.

Figure 5:
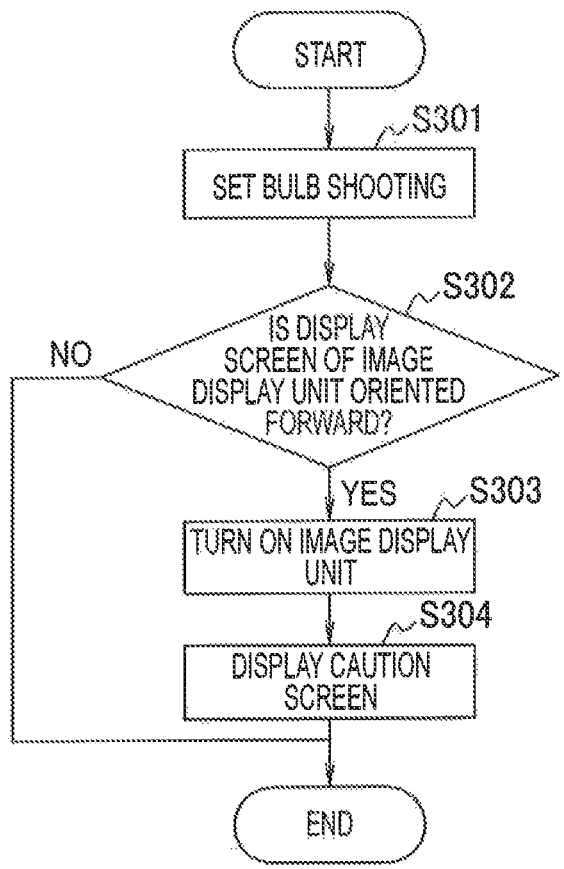
FIG. 5 is a flowchart of a process by the imaging apparatus to display a caution screen.

Next, the operations of the imaging apparatus 1 set by the user to the mode for bulb shooting will be explained with reference to the flowchart of FIG. 5.

When the user sets the imaging apparatus 1 to the mode for bulb shooting, the verification image during bulb shooting may not be displayed on the image display unit 28 depending on the orientation of the display screen of the image display unit 28 against the user's expectation. Therefore, it is necessary to inform the user that the verification image may not be displayed. In the embodiment, the user is informed using a caution screen 601 illustrated in FIG. 6, as described below.

At step S301, when the user performs a predetermined operation using the operation unit 70, the system control circuit 50 sets the imaging apparatus 1 to the mode for bulb shooting.

At step S302, the system control circuit 50 verifies the orientation of the display screen of the image display unit 28.

When the display screen of the image display unit 28 is oriented forward, the imaging apparatus 1 can neither turn on the backlight of the image display unit 28 nor display the verification image as explained above with reference to FIGS. 3 and 4. At this time, the system control circuit 50 determines that there is a need to display a screen for calling the user's attention, and moves the process to step S303.

When the display screen of the image display unit 28 is not oriented forward, the verification image during bulb shooting is displayed on the image display unit 28 unless the orientation of the display screen of the image display unit 28 is changed. At this time, the system control circuit 50 determines that there is no need to display a screen for calling the user's attention, and terminates the process described in FIG. 5.

At step S303, the backlight of the image display unit 28 is turned on under control of the system control circuit 50.

Figure 6:
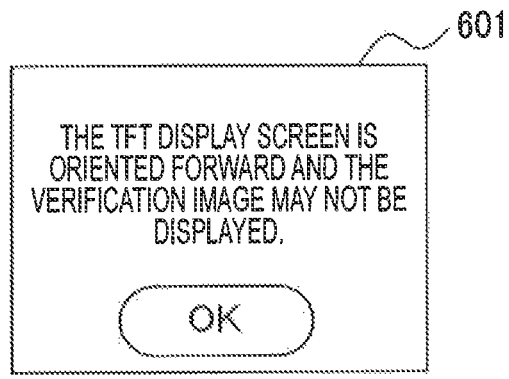
FIG. 6 is a diagram of the caution screen displayed on the imaging apparatus.

At step S304, the caution screen 601 is displayed on the image display unit 28 under control of the system control circuit 50. FIG. 6 illustrates an example of the caution screen 601. The caution screen 601 is a screen for calling the user's attention by providing notification that the verification image may not be displayed.

In the process described in FIG. 4, it is determined whether to turn on the backlight of the image display unit 28 taking into account the orientation of the display screen of the image display unit 28 and the brightness of the added image data. Alternatively, it can be determined whether to turn on the backlight of the image display unit 28 taking into account the orientation of the display screen of the image display unit 28 and the length of a lens barrel (not illustrated) within which the imaging lens 310 is disposed. The components of the lens unit 300 are disposed in the lens barrel.

When the display screen of the image display unit 28 is oriented forward and the length of the lens barrel is less than a predetermined length, the system control circuit 50 performs a control to turn off the backlight of the image display unit 28. When the length of the lens barrel is greater than or equal to the predetermined length or when the display screen of the image display unit 28 is not oriented forward, the system control circuit 50 performs a control to turn on the backlight of the image display unit 28 and display the verification image.

Whether the length of the lens barrel is less than the predetermined length is determined by the system control circuit 50 is based on, for example, the lens identification information received from the lens unit 300 via the interface 120.

Alternatively, it can be determined whether to turn on the backlight of the image display unit 28 by taking into account the orientation of the display screen of the image display unit 28 and the distance from the imaging apparatus 1 to the subject.

When the display screen of the image display unit 28 is orientated forward and the distance from the imaging apparatus 1 to the subject is less than a predetermined distance, the system control circuit 50 performs a control to turn off the backlight of the image display unit 28. When the distance to the subject is greater than or equal to the predetermined distance or when the display screen of the image display unit 28 is not oriented forward, the system control circuit 50 performs a control to turn on the backlight of the image display unit 28 and display the verification image.

In addition, when the display screen of the image display unit 28 is oriented forward, the backlight of the image display unit 28 can be controlled to be brighter as the distance from the imaging apparatus 1 to the subject increases.

The distance from the imaging apparatus 1 to the subject can be obtained by the system control circuit 50 analyzing the image data, by the user inputting the value of the distance into the imaging apparatus 1, or by a sensor (not illustrated) included in the imaging apparatus 1 measuring the distance.

In the foregoing embodiment, the system control circuit 50 performs a control to turn off the backlight of the image display unit 28 depending on the orientation of the display screen of the image display unit 28 and the like. Instead of performing a control to turn off the backlight of the image display unit 28, the system control circuit 50 can perform a control so as not to display the verification image during bulb shooting on the image display unit 28. At this time, the system control circuit 50 displays a menu screen or a setting screen, for example, instead of the verification image. The menu screen and the setting screen are generally not so bright as to exert influence on shooting of the subject. In addition, the user can operate the menu screen and the setting screen even during bulb shooting. Therefore, convenience of use of the imaging apparatus 1 while suppressing influence on shooting of the subject can be achieved. The system control circuit 50 can display the menu screen and the setting screen with lower brightness.

Alternatively, the system control circuit 50 can perform a control to turn on the backlight of the image display unit 28 with a lower brightness level than the general brightness level, instead of performing a control to turn off the backlight of the image display unit 28. For example, when the display screen of the image display unit 28 is oriented toward the subject, the system control circuit 50 can perform a control to lower the brightness of the display screen of the image display unit 28 as compared to the case where the display screen of the image display unit 28 is not oriented toward the subject. This enables the user to refer to the verification image while suppressing influence on shooting of the subject even though the display screen of the image display unit 28 is oriented toward the subject or the like. This improves the convenience of the imaging apparatus 1 during bulb shooting.

In the foregoing embodiment, when the orientation of the display screen of the image display unit 28 is equal to the orientation of the imaging lens 310, the display screen of the image display unit 28 is regarded to be oriented toward the subject. Alternatively, when the angle formed by the direction from the imaging apparatus 1 to the center of the subject image and the direction in which the display screen of the image display unit 28 is oriented falls within a predetermined angle, the display screen of the image display unit 28 can be regarded as being oriented toward the subject. This further suppresses the influence on shooting of the subject. The predetermined angle is the maximum angle of the display screen at which the light from the display screen of the image display unit 28 exerts influence on shooting, for example, and is pre-set in the imaging apparatus 1.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-216072, filed Nov. 2, 2015, which is hereby incorporated by reference herein in its entirety.

What is claimed is:

1. An imaging apparatus, comprising:
   an imaging unit configured to capture an image of a subject;
   a display unit configured to display the captured image on a display screen and configured to be moveable so as to change the orientation of the display screen;
   a control unit configured to control a brightness of the display screen based on the orientation of the display screen, wherein
   when a predetermined shooting mode is set and the display screen is oriented toward the subject, the control unit lowers the brightness of the display screen compared to a brightness when the display screen is not oriented toward the subject; and
   a notification unit configured to display a screen providing notification on the display screen when the predetermined shooting mode is set and the display screen is oriented toward the subject.

2. The imaging apparatus according to claim 1, wherein, when the predetermined shooting mode is set and the display screen is oriented toward the subject, the control unit does not display the captured image on the display unit or turn off the display unit.

3. The imaging apparatus according to claim 1, wherein the control unit determines the display screen to be oriented toward the subject when an angle formed by a direction toward a center of the subject and a direction in which the display screen is oriented fall within a predetermined angle.

4. The imaging apparatus according to claim 1, wherein the predetermined shooting mode is a bulb shooting mode.

5. A non-transitory computer-readable storage medium storing computer executable instructions causing a computer to execute a control method to control an imaging apparatus including an imaging unit configured to capture an image of a subject and a display unit configured to display the captured image on a display screen and configured to be moveable so as to change the orientation of the display screen, the control method comprising:
   capturing an image of a subject;
   displaying the captured image on the display screen; and
   controlling a brightness of the display screen based on the orientation of the display screen,
   wherein when a predetermined shooting mode is set and the display screen is oriented towards the subject, lowering the brightness of the display screen compared to a brightness when the display screen is not oriented toward the subject and displaying a screen providing notification on the display screen,
   wherein the screen providing the notification includes text indicating that the display is oriented forward and the captured image is not displayed.

* * * * *